US008047237B2

(12) United States Patent
Limas

(10) Patent No.: US 8,047,237 B2
(45) Date of Patent: Nov. 1, 2011

(54) THERMOSETTING OR THERMOPLASTIC ARRANGEMENT FOR MANUFACTURING PIPING FOR AIR CONDITIONING

(75) Inventor: Marc Limas, Blere (FR)

(73) Assignee: Daher Aerospace, Saint-Julien-de-Chedon (FR)

( * ) Notice: Subject to any disclaimer, the term of this patent is extended or adjusted under 35 U.S.C. 154(b) by 1058 days.

(21) Appl. No.: 11/822,868

(22) Filed: Jul. 10, 2007

(65) Prior Publication Data

US 2009/0014081 A1   Jan. 15, 2009

(30) Foreign Application Priority Data

Jul. 10, 2006   (FR) ...................................... 06 06255

(51) Int. Cl.
*F16L 11/00* (2006.01)
(52) U.S. Cl. ......... 138/125; 138/123; 138/145; 138/124
(58) Field of Classification Search .......... 138/123–126, 138/145, 146
See application file for complete search history.

(56) References Cited

U.S. PATENT DOCUMENTS

| 3,357,456 | A |   | 12/1967 | Grawey et al. ................ 138/127 |
| 4,173,670 | A | * | 11/1979 | VanAuken .................... 138/123 |
| 4,192,351 | A |   | 3/1980 | Henry ............................ 138/126 |
| 4,273,160 | A | * | 6/1981 | Lowles ......................... 138/124 |
| 4,420,018 | A | * | 12/1983 | Brown, Jr. .................... 138/124 |
| 4,926,909 | A |   | 5/1990 | Salinas ......................... 138/109 |
| 5,383,062 | A | * | 1/1995 | Sato et al. ..................... 359/894 |
| 5,732,746 | A |   | 3/1998 | Leroy et al. .................. 138/123 |
| 5,960,834 | A |   | 10/1999 | Sekido et al. ................ 138/125 |
| 6,026,862 | A | * | 2/2000 | Friedrich et al. ............. 138/112 |
| 6,695,015 | B1 | * | 2/2004 | Ono et al. ..................... 138/126 |
| 7,021,339 | B2 | * | 4/2006 | Hagiwara et al. ............ 138/123 |
| 2005/0199309 | A1 | * | 9/2005 | Kamiyama ................... 138/127 |
| 2005/0257847 | A1 | * | 11/2005 | Francesco et al. ............ 138/125 |

FOREIGN PATENT DOCUMENTS

| EP | 0447199 | 3/1991 |
| EP | 1188976 | 9/2001 |
| FR | 2699979 | 7/1994 |
| WO | 9932273 | 7/1999 |
| WO | 2006118448 | 11/2006 |

\* cited by examiner

*Primary Examiner* — Patrick F Brinson
(74) *Attorney, Agent, or Firm* — Jacobson Holman, PLLC

(57) ABSTRACT

Thermosetting or thermoplastic arrangement for the manufacturing of pipes (1), made up of a pile of plies (3) in composite materials, characterized in that it comprises at least one structural ply (5) and at least one rigidity ply (7). More specifically, the said at least one rigidity ply (7) takes the form of a perforated or meshed ply and is placed on at least part of the length of the said pipe (1). Further, the said at least one rigidity ply (7) is placed last while forming the pile. Alternatively, the arrangement according to the invention comprises reinforcement means (2) and/or sealing means (6).

8 Claims, 2 Drawing Sheets

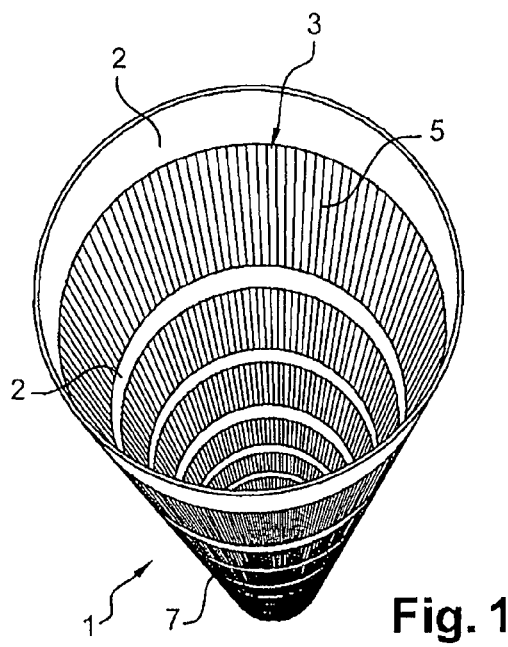
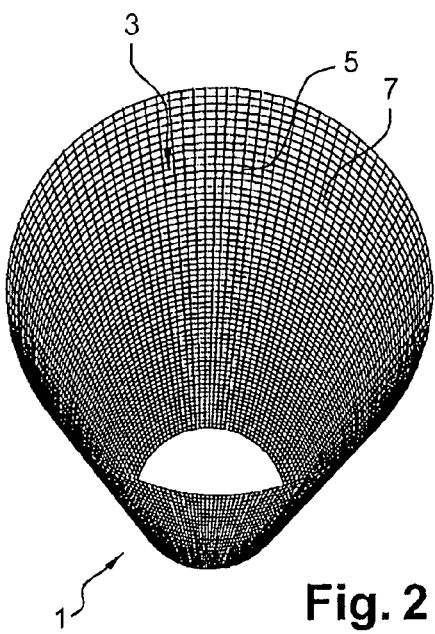
Fig. 1  Fig. 2
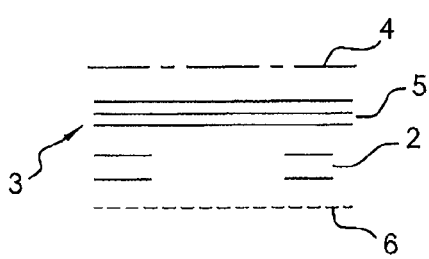
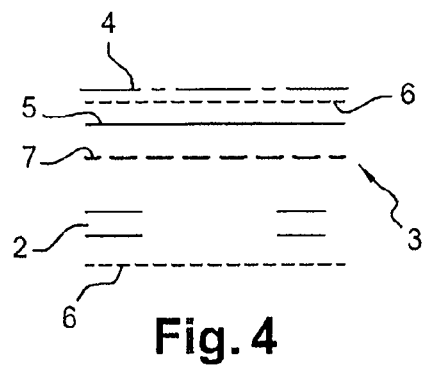
Fig. 3  Fig. 4
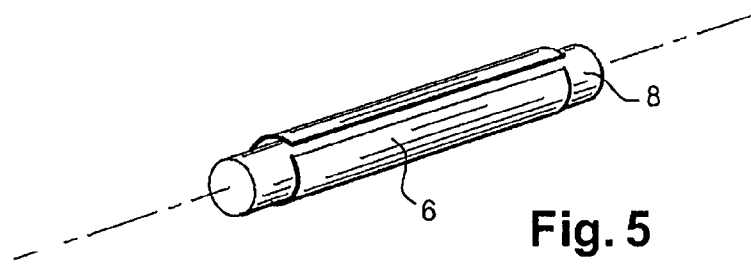
Fig. 5

THERMOSETTING OR THERMOPLASTIC ARRANGEMENT FOR MANUFACTURING PIPING FOR AIR CONDITIONING

This invention belongs to the field of piping for air conditioning.

More precisely, the invention relates to a thermosetting or thermoplastic arrangement for manufacturing piping for aircraft air conditioning, made of composite materials, operating under positive and negative pressure.

The piping used for this application is required to withstand certain static negative pressures in a variable atmosphere, such as for instance from −54° C. to +85° C., while meeting some strict standard requirements, particularly as regards their physical characteristics such as lifelong sealing, flexibility in order to withstand vibrations, as well as internal and external temperature differences.

In general, the structure of piping for aircraft air conditioning is made up of strata of plies or layers of fabrics and resins piled one above the other. That pile structure makes it possible to obtain a certain degree of thickness so as to achieve the capacity to withstand the induced internal pressure and any external mechanical stresses such as snagging, repeated handling, tightening and the like.

These pipes are usually made of composite materials, resulting from a mixture of thermosetting resin such as phenolic resin or epoxy resin, for instance, or thermoplastic resin and reinforcement with fibreglass, carbon fibre, fabrics or other materials.

FR 2 699 979 describes a multilayer duct and a die for manufacturing it, comprised of armoring in synthetic material having, over all or part of its length, a reticulate lacunary structure, at least one of the sides—inside or outside—of which is bonded to a tubular ply made of synthetic material that blocks the lacunary structure of the armoring.

U.S. Pat. No. 4,926,909 discloses a nipple fitting for elastomeric hoses, comprising a nipple and a substantially annular nipple end bead that is mounted fixedly and circumferentially on the said nipple. The said nipple is a member having a perforated grid with a cylindrical configuration.

An articulated duct made of thermoplastic material formed from a flat laminate is known according to EP 1394462. Preferably, the duct is made of preforms that are cut according to the desired shape and size of the duct.

According to U.S. Pat. No. 6,228,312, there exists a thermoplastic composite product and a method of lining pipework. The duct liner is made of a layer of composite material comprising thermoplastic filaments, filaments of reinforcing fibres, and an outer layer of thermoplastic material.

EP 0 857 570 discloses a composite thermoplastic-elastomer product such as, for instance, a pipe carrying refrigerant for the air-conditioning circuit of automobile vehicles.

To that end, the invention provides a composite product comprising an internal layer made of a mixture of thermoplastic and at least one modifying agent, covered by a layer made of a mixture of elastomer and at least one modifying agent.

The materials used currently are made of one or more layers of resin of the phenolic type, associated or not with one or more layers of glass fabric. They may also be supplemented by a layer of resin in order to complete airtightness. The pipes made from these materials are very lightweight but are very fragile and too soft. They are readily vulnerable when they are being positioned or installed, used, handled or maintained.

The existing conventional solutions for that problem consist in adding an additional ply to the structure, for instance. That solution makes the pipe more rigid, but mainly has the drawback of adding mass to the piping.

A second solution is to add local reinforcements that partly overcome (increased mass) the major drawback of the first solution, but require more labour and complicate the duct manufacturing process.

A third solution would be to make a change in material to make the structure more rigid and lighter. However, this last solution seems to be the most expensive.

It is thus difficult to increase the rigidity of a pipe without increasing its mass or cost. Current research focuses on developing lighter pipes that are just as rigid.

This invention overcomes the drawbacks of the prior art by providing an arrangement that makes it possible to improve rigidity while retaining a very small mass.

The arrangement according to the invention makes it possible to diminish the cost of the loss due to breakage during the manufacturing, transport, installation and maintenance of the piping, and save labour costs.

Further, the arrangement according to the invention makes it possible to achieve non-slipping means that make for easier handling.

To that end, the thermosetting or thermoplastic arrangement according to the invention, for manufacturing pipes, formed of several plies of composite materials piled one above the other, is characterized in that it includes at least one structural ply and at least one rigidity ply.

More precisely, the said at least one rigidity ply takes the form of a perforated or meshed ply and is placed on at least part of the length of the said pipe. Also, the said at least one rigidity ply is placed last while the plies are piled one above the other or first or in between two plies when the pile is formed.

The said at least one structural ply and rigidity ply are advantageously made up of at least one resin associated or not with at least one fabric, e.g. glass and/or carbon and/or Kevlar®. The resin may for example be a phenolic resin, an epoxy resin or the like.

Alternatively, the arrangement according to the invention includes reinforcing means and/or tightness means.

More particularly, the said reinforcing means are located at the ends and/or over the entire length of the said pipe.

To overcome the obstacles of the prior art, the invention also relates to a manufacturing process of a thermosetting or thermoplastic arrangement for the manufacture of pipes, characterized in that it includes the following steps:
i) placing of sealing film on the mould;
ii) placing of at least one structural ply on an appropriate mould;
iii) application of at least one perforated or meshed ply;
iv) wrapping with a ribbon of heat-shrinking film and/or vacuum bag;
v) application of vacuum;
vi) curing;
vii) stripping and finishing of the pipe.

Alternatively, the following steps may be provided:
i) before the wrapping step, addition of reinforcing means at the ends and/or over the entire length of the pipe;
ii) after the stripping step, application of sealing film, if the step involving the placing of sealing film on the mould has not been carried out;
iii) The pipe may be made in a mould (instead of on a mould). In that case, the order of depositing of the various layers is to be reversed.

The invention will be better understood in the light of the description below, which refers to illustrative examples of the invention that are not limitative in any event, by reference to the enclosed drawings, where:

FIGS. 1 and 2 are front views in perspective of the arrangement according to the invention;

FIG. 3 is a drawing illustrating the known "micro-sandwich" concept;

FIG. 4 is a drawing of an example of constitution of the arrangement according to the invention;

FIGS. 5 to 8 are side views in perspective of the arrangement according to the invention as the steps of its manufacturing process advance.

Figure 6:
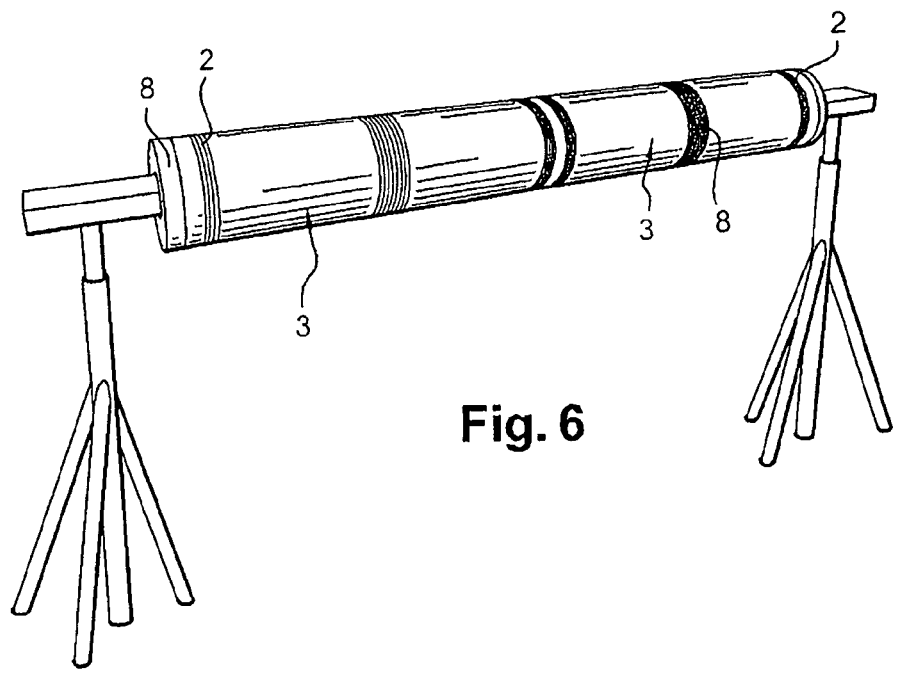

The aim of the invention is to make it possible to reduce the mass of the thermosetting or thermoplastic piping for air conditioning, while guaranteeing its rigidity at the same time.

FIGS. 1 and 2 are front views in perspective of the arrangement according to the invention.

More precisely, these views represent the arrangement according to the invention forming a pipe or duct 1 containing reinforcing means 2 or not, respectively.

The structure of air conditioning piping and particularly that of aircraft is formed of piled plies or layers 3 made of fabrics and resins. The desired thickness of the arrangement according to the invention results from the number of plies, making it possible to obtain certain physical and mechanical resistance, e.g. to pressure, temperature, gas exchange or external impacts.

Typically, the arrangement according to the invention has a cylindrical shape but may also take all geometric shapes. It may take the form of preforms in order to make it possible to have adaptable or articulated ducts.

Alternatively, the arrangement according to the invention forming a duct or pipe 1 may also comprise reinforcing means 2, at the ends and over the entire length.

These reinforcing means 2 are analogous to usual plies; however, they have a small width and length so as to be placed locally.

FIG. 3 is a drawing illustrating the known "micro-sandwich" concept of piping.

In order to achieve a flexible and strong piping structure, the existing known principle is as follows: it is necessary, from the centre of the duct 1 along a horizontal axis of symmetry 4, to place a certain number of plies 3.

More precisely, this number of plies 3 is made up of a number n or n plies that is defined beforehand on the basis of the desired thickness, structure, mechanical strength and subsequent application.

The n structural plies 5 are made up, for instance, of preimpregnated fabrics. The composite materials used for making those plies 5 are a phenolic resin that may or may not be associated with one or more layers of glass or carbon fabrics, or the like.

The addition of reinforcing means 2 may be provided at the ends and over the entire length of duct 1.

Preferentially, sealing means 6 or a sealing film is added in order to complete the tightness of the known arrangement.

The sealing film 6 is placed inside and/or outside the piping.

FIG. 4 is a diagram of an example of the constitution of the arrangement according to the invention.

The principle of the invention lies in the addition of an additional rigidity ply 7 with no change in material and no significant increase in the mass of piping 1.

In fact, the sandwich concept is realized in an analogous fashion. The mechanical structure of the arrangement obtained results from the application of the n plies 5 from the centre along a horizontal axis of symmetry 4 of pipe 1. These plies 5 are, for instance, made of at least one glass fabric associated or not with at least one resin, for instance of the phenolic type. They may also be made up of at least one resin associated with at least one carbon fabric.

Alternatively, a so-called hybrid structure may be used, comprising at least one glass and carbon fabric and at least one resin, for instance of the phenolic type.

The rigidity ply 7 made up of perforated or meshed material is then placed. The latter provides deformation rigidity and prevents the breakage that is often related to handling during positioning, installation, use and maintenance.

That perforated rigidity ply 7 may for instance be made up of the same fabric as that which forms the structure of the arrangement according to the invention, i.e. with at least one resin, for instance of the phenolic type, associated or not with at least one glass and/or carbon and/or Kevlar® fabric.

Alternatively, it may be assimilated with a micro-core of the felt type.

These perforated plies 7 are manufactured exactly like the pre-impregnated fabrics 4 used as the structure or framework of pipe 1. However, they are then placed on a punch or in a die or mould, not illustrated, but of a type known in itself. The ply 7 is very perforated, and may be made of a grid mesh. In that way, it remains lightweight, at the same time providing thickness for the rigidity of the resulting arrangement.

The perforated ply 7 may for instance be placed over the entire length of piping 1 in order not to create fragile areas. It may also be placed on at least part of the length of duct 1.

Preferentially, at least one meshed ply 7 is placed as the last outer ply of the pile that makes up the arrangement forming subsequently the duct 1.

Alternatively, at least one perforated ply 7 may also be placed as the first ply, or even between the structural plies 5 of the pile.

Further, the arrangement according to the invention makes it possible to obtain non-slipping means that offer protection from harmful external mechanical stresses such as snags, multiple handling, tightening during transport, handling, installation or maintenance and the like.

This arrangement according to the invention may be fitted with couplings or rings at the ends, for example, or may provide connection, joining, support or take-up areas. To that end, the pipe 1 achieved according to the invention may have several connecting arrangements so as to match with another pipe or to connect it to a different arrangement. These accessory arrangements are not shown, but are of a type known in itself.

Alternatively, another layer of material or ply may be added, such as structural plies 5 on the meshed layer 7 for reasons relating to the appearance.

For instance, reinforcing means 2, made up of pre-impregnated fabrics, may be added to the ends of pipe 1.

A sealing layer 6 may be applied on all the plies 3 and reinforcing means 2, in order to complete airtightness.

Piping 1, with this meshed rigidity reinforcement system 7, may also be used to reinforce pipes used under a vacuum.

Figure 7:
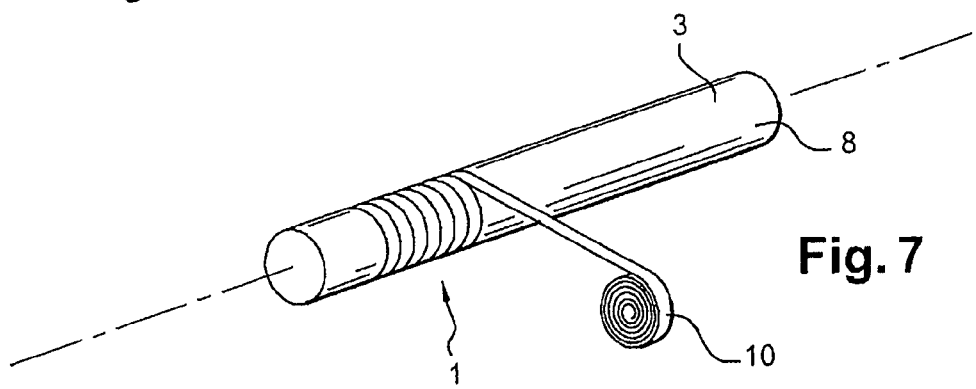
Figure 8:
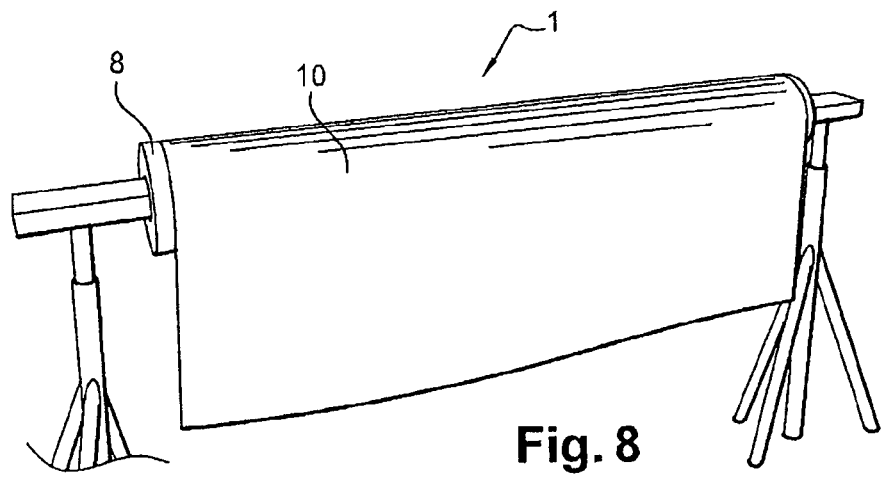

FIGS. 5-8 are side views in perspective of the arrangement according to the invention as its manufacturing process advances.

The manufacturing steps of the arrangement according to the invention are as described below. The tooling used depends on the desired geometrical shape of duct 1.

As an example, in order to obtain a cylindrical duct, a mandrel 8 may be used as a mould on which each ply 3 is placed.

Alternatively, in this example, the manufacturing of ducts 1 may also be achieved inside a mould that is hollow and adapted to the desired dimensions of the final arrangement. The mould is not represented, but is of a type known in itself.

Regardless of the type of mould used, a layer that makes up a tightness barrier 6 is to be applied on mandrel 8.

Thereafter, one or more structural plies 5 made up of pre-impregnated fabrics with at least one resin of the phenolic type and fabrics of the carbon and/or glass type are placed.

Preferentially, one or more structural plies 5 will be placed.

A perforated or meshed ply 7 is then preferentially placed over the entire length of the structural plies 5, thereby forming the duct 1.

Alternatively, such ply may be placed in one or more layers on at least part of the length of the structural plies 5, and as the first ply or in between plies or even as the last ply of the pile forming the duct 1.

Reinforcement means 2 are then preferentially added to the ends and/or over the entire length of pipe 1.

One or more plies 5 may be added after the placing of the perforated ply or plies 7.

Before applying a vacuum to duct 1 formed in this way and ready for curing, it is wrapped with a ribbon of heat-shrinking film 10 and/or a vacuum bag, not shown but of a type known in itself.

Once the vacuum has been applied, the arrangement 1, on or in its mould is cured in a stove or autoclave. The time and heat applied for stove curing depend on the materials used.

Thereafter, the vacuum bag is taken off and the cylindrical tube 1 formed in this way is stripped by sliding it off the tool 8, and the heat-shrinking film 10 is removed.

Finally, the piping 1 is cut to length and finished.

The number and nature of fabrics and resins to be used depend on the desired duct structure.

The arrangement according to the invention makes it possible to improve rigidity while retaining a very low mass of air-conditioning piping.

The invention claimed is:

1. Pipe formed of a pile of plies of thermosetting or thermoplastic composite material, said pipe comprising
   a pile of structural plies, said structural plies including a plurality of fabric plies and at least one rigidity ply, said plurality of fabric plies and said at least one rigidity ply being of a same material, the at least one rigidity ply being formed of a perforated ply made up of a grid mesh, the grid mesh having perforations of a size substantially greater than any of the other structural plies for reduction of weight while maintaining rigidity.

2. Pipe according to claim 1, wherein said perforated ply is made of at least one resin.

3. Pipe according to claim 2, wherein said perforated ply is made of a phenolic resin.

4. Pipe according to claim 2, wherein the resin of said perforated ply is associated with at least one of glass and carbon.

5. Pipe according to claim 1, wherein said perforated ply is located over an entire length of the pipe.

6. Pipe according to claim 1, wherein the at least one rigidity ply is a last outer ply of the pile making up an arrangement of the pipe.

7. Pipe according to claim 1, wherein the perforated ply is a first ply of the pipe.

8. Pipe according to claim 1, wherein the perforated ply is located between the structural plies of the pile.

* * * * *